United States Patent
Hsu

(10) Patent No.: US 9,031,350 B2
(45) Date of Patent: May 12, 2015

(54) METHOD FOR PROCESSING EDGES IN AN IMAGE AND IMAGE PROCESSING APPARATUS

(71) Applicant: Novatek Microelectronics Corp., Hsinchu (TW)

(72) Inventor: Wei Hsu, Taoyuan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 223 days.

(21) Appl. No.: 13/752,378

(22) Filed: Jan. 28, 2013

(65) Prior Publication Data

US 2013/0216153 A1 Aug. 22, 2013

(30) Foreign Application Priority Data

Feb. 20, 2012 (TW) .............................. 101105536 A

(51) Int. Cl.
*G06K 9/40* (2006.01)
*G06T 5/00* (2006.01)
*G06T 5/20* (2006.01)

(52) U.S. Cl.
CPC . *G06T 5/002* (2013.01); *G06T 5/20* (2013.01); *G06T 2207/20192* (2013.01)

(58) Field of Classification Search
USPC .................................................. 382/263, 266
See application file for complete search history.

(56) References Cited

U.S. PATENT DOCUMENTS

| 8,165,415 B2 * | 4/2012 | Hsu ............................... 382/269 |
| 8,737,758 B2 * | 5/2014 | Kim et al. ..................... 382/260 |
| 2010/0188582 A1 * | 7/2010 | Hsu ............................... 348/607 |

FOREIGN PATENT DOCUMENTS

| TW | I245547 | 12/2005 |
| TW | 201028962 A | 8/2010 |
| TW | 201103309 A | 1/2011 |
| TW | I336595 | 1/2011 |

OTHER PUBLICATIONS

Office Action issued by Taiwan Intellectual Property Office on Feb. 26, 2014.
Mei, Pu Hua, Digital Camera Image Noise Reduction with Calibration, Dissertation, National Taiwan University, Dec. 2005, pp. I to 48.
Yen-Ian Huang, Noise Reduction Using Enhanced Bilateral Filter, Dissertation, National Taiwan University, Jun. 2006, pp. I-73.

* cited by examiner

*Primary Examiner* — Yon Couso
(74) *Attorney, Agent, or Firm* — Rabin & Berdo, P.C.

(57) ABSTRACT

Method and apparatus for processing edges in an image are provided. The method in an embodiment includes the following steps. With respect to a cross-shaped patterned centered at a target pixel of an input image, a first-direction gradient along a first direction and a second-direction gradient along a second direction are calculated. According to the first-direction and second-direction gradients, it is determined whether to compensate the target pixel based on pixel values of a first plurality of pixels along the second direction or pixel values of a second plurality of pixels along the first direction within the cross-shaped pattern, or to output a pixel value of the target pixel.

22 Claims, 4 Drawing Sheets

METHOD FOR PROCESSING EDGES IN AN IMAGE AND IMAGE PROCESSING APPARATUS

This application claims the benefit of Taiwan application Serial No. 101105536, filed Feb. 20, 2012, the subject matter of which is incorporated herein by reference.

BACKGROUND OF THE INVENTION

1. Field of the Invention

The invention relates to a method for processing edges in an image and image processing apparatus.

2. Description of the Related Art

In image processing, an input image may be a result of an analog gain process based on an analog gain, or a result captured based on a large ISO value selected or under a circumstance of insufficient photosensitivity. Accordingly, such input image may have noises or even amplified noises caused by the gain, such that edges in the image may appear unsmooth. A conventional approach for noise reduction is to process with a low-pass filter, for example. However, after being processed by the low-pass filter, the image may become blurred, and so an edge enhancement process is additionally performed as compensation. Consequently, as the noises nevertheless exist in the image although being blurred, the image quality is degraded.

SUMMARY OF THE INVENTION

The invention is directed to a method and associated apparatus for processing edges in an image.

According to an aspect of the present invention, a method for processing edges in an image is provided. The method according to an embodiment includes steps of: a) calculating a first-direction gradient along a first direction and a second-direction gradient along a second direction with respect to a cross-shaped patterned centered at a target pixel within a region of an input image; b) determining whether the first-direction gradient is greater than a first comparison gradient determined according to the second-direction gradient; c) when a determination result of step (a) is affirmative, obtaining a first estimated pixel value based on pixel values of a first plurality of pixels along the second direction within the cross-shaped pattern as an estimated pixel value of the target pixel; d) when the determination result of step (a) is negative, determining whether the second-direction gradient is greater than a second comparison gradient determined according to the first-direction gradient; e) when a determination result of step (d) is affirmative, obtaining a second estimated pixel value based on pixel values of a second plurality of pixels along the first direction within the cross-shaped pattern as the estimated pixel value of the target pixel; and f) when the determination result of step (d) is negative, outputting a pixel value of the target pixel.

According to another aspect of the present invention, an apparatus for processing edges in an image is provided. The apparatus according to an embodiment includes a noise suppression unit, an edge low-pass filtering unit and an edge enhancement unit. The noise suppression unit includes a low-pass filter, and receives a first image to perform a noise suppression process on the first image to output a second image. The edge low-pass filtering unit receives the second image to perform an edge low-pass filter process on the second image to smooth edges in the second image and to output a third image. The edge enhancement unit includes a high-pass filter, and receives the third image to enhance edges in the third image.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
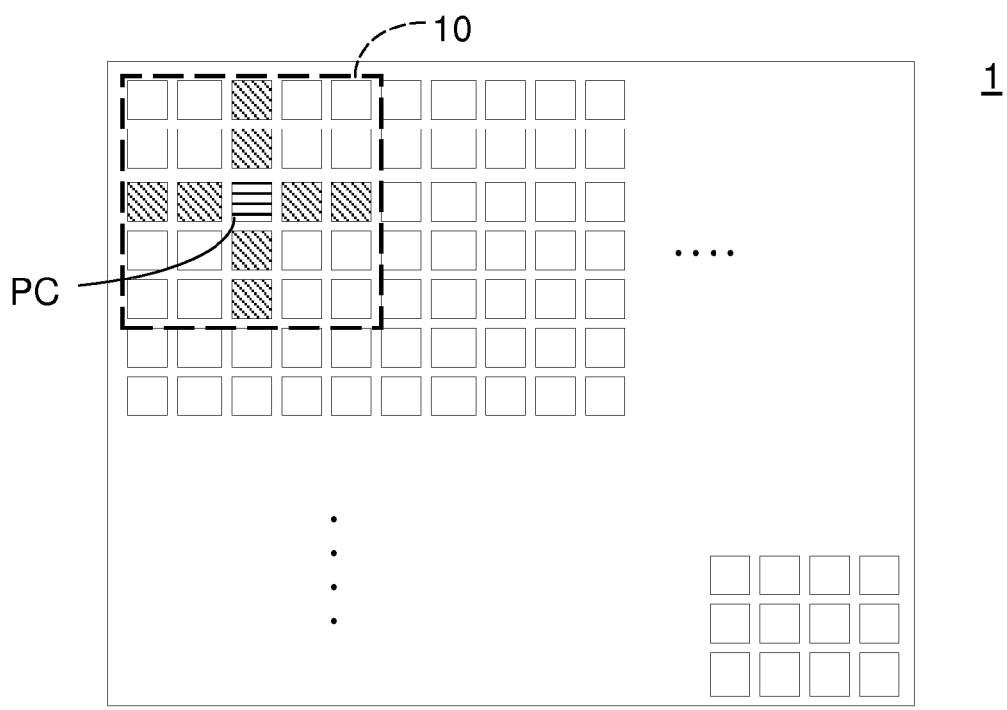
FIG. 1 is a schematic diagram of a digital image.
Figure 3:
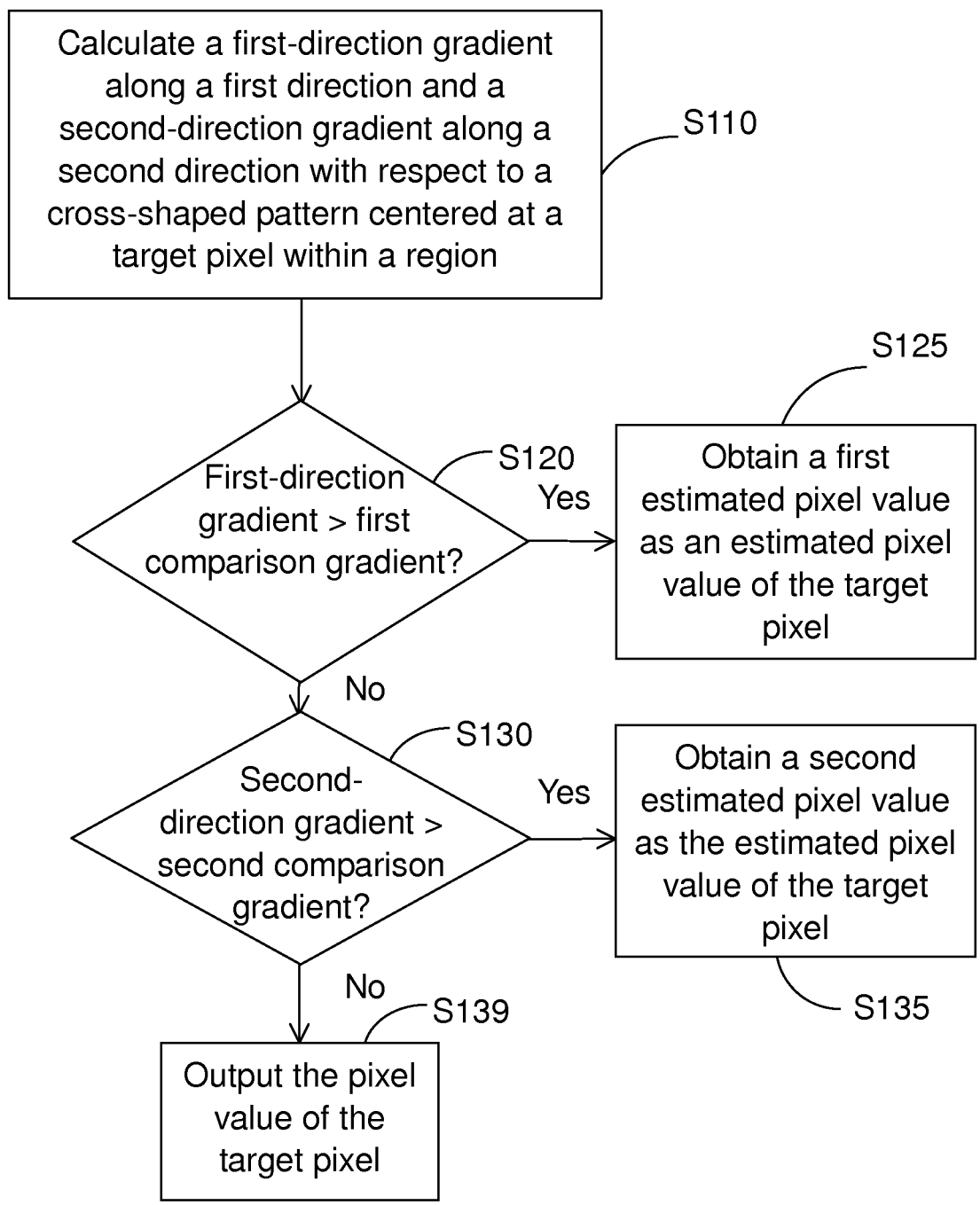
FIG. 3 is a flowchart of a method for processing edges in an image according to an embodiment.

Embodiments of a method for processing edges in an image and an apparatus for processing edges in an image are provided below. FIG. 3 shows a flowchart of a method for processing edges in an image according to an embodiment. The method of the embodiment may be applied to process a region 10 centered at a target pixel PC in an input image 1 (e.g., a still image or a dynamic image) in FIG. 1 to generate an estimated pixel value of the target pixel PC. By applying the method of the embodiment, the pixels in the input image 1 are taken as individual target pixels in a predetermined sequence, such as line by line, so as to determine respective estimated pixel values, and the estimated pixel values are then utilized as substitution of the corresponding target pixels to form an edge-processed output image. In some embodiments, the output image obtained from the edge processing is given smoother edges compared to the input image. The method for processing edges in an image may be implemented in various image processing apparatuses, for example, by an edge low-pass filtering unit 420 (e.g., an image processing chip or an image engine) in an image processing apparatus 40 in FIG. 4, or by an image module or a processing unit in an electronic apparatus in FIG. 6.

Referring to FIG. 3, in step S110, within a region of an input image, a first-direction gradient along a first direction and a second-direction gradient along a second direction are calculated with respect to a cross-shaped pattern centered at a pixel value within the region. For example, referring to FIG. 2, the cross-shaped pattern is a cross-shaped pattern 101 or 102 centered at a target pixel PC within a region 10 of an input image 1. Further, the first direction and the second direction may respectively be the horizontal direction and the vertical direction, or vice versa.

In step S120, it is determined whether the first-direction gradient is greater than a first comparison gradient, wherein the first comparison gradient is determined according to the second-direction gradient. When a determination result of step S120 is affirmative, step S125 is performed. In step S125, a first estimated pixel value based on pixel values of a first plurality of pixels along the second direction within the cross-shaped pattern is obtained as an estimated pixel value of the target pixel. Step S130 is performed when the determination result in step S120 is negative. In step S130, it is determined whether the second-direction gradient is greater than a second comparison gradient, wherein the second comparison gradient is determined according to the first-direction gradient. When a determination result of step S130 is affirmative, step S135 is performed. In step S135, a second estimated value based on pixel values of a second plurality of pixels along the first direction within the cross-shaped pattern is obtained as the estimated pixel value of the target pixel. When the determination result of step S130 is negative, step S139 is performed to output a pixel value (to be regarded as the estimated pixel value) of the target value.

Taking the cross-shaped patterns 101 and 102 for example, details of the steps in FIG. 3 according to different embodiments are described below.

In step S110, one or more first-direction unit gradients for pixels located at different distances from a target pixel PC along the first direction (e.g., the vertical direction) within the cross-shaped pattern are calculated. Determined by differencing calculation, the one or more first-direction unit gradients of the cross-shaped pattern can be represented as: |PC−V1| and |PC−V2|, where V1 and V2 respectively represent pixel values of two pixels along the vertical direction within the cross-shaped pattern 101 in FIG. 2. The one or more first-direction unit gradients of the cross-shaped pattern 102 may be represented as: |PC−V1|, |PC−V2|, |V0−V1|, and |V2−V3|, where V0, V1, V2, and V3 respectively represent pixel values of four pixels along the vertical direction within the cross-shaped pattern 102.

The first-direction gradient is, for example, a sum of the one or more first-direction unit gradients. For example, each of the one or more first-direction unit gradients is a sum of absolute differences of two sets of two adjacent pixels at two opposite sides of the target pixel along the first direction within the cross-shaped pattern. With respect to the cross-shaped pattern 101, for example, the first-direction gradient is deltaV=|PC−V1|+|PC−V2|; for the cross-shaped pattern 102, for example, the first-direction gradient is deltaV=|PC−V1|+|PC−V2|+|V0−V1|+|V2−V3|.

Further, one or more second-direction unit gradients for pixels located at different distances from the target pixel PC along a second direction (e.g., the horizontal direction) within the cross-shaped pattern are calculated. Determined by differencing calculation, the one or more second-direction unit gradients of the cross-shaped pattern can be represented as: |PC−H1| and |PC−H2|, where H1 and H2 respectively represent pixel values of two pixels along the horizontal direction within the cross-shaped pattern 101 in FIG. 2. The one or more second-direction unit gradients of the cross-shaped pattern 102 may be represented as: |PC−H1|, |PC−H2|, |H0−H1|, and |H2−H3|, where H0, H1, H2, and H3 respectively represent pixel values of four pixels along the horizontal direction within the cross-shaped pattern 102.

The second-direction gradient is, for example, a sum of the one or more second-direction unit gradients. For example, each of the one or more second-direction unit gradients is a sum of absolute differences of two sets of two adjacent pixels at two opposite sides of the target pixel along the second direction within the cross-shaped pattern. With respect to the cross-shaped pattern 101, for example, the second-direction gradient is deltaH=|PC−H1|+|PC−H2|; for the cross-shaped pattern 102, for example, the second-direction gradient is deltaH=|PC−H1|+|PC−H2|+|H0−H1|+|H2−H3|.

In step S120, for example, the first comparison gradient substantially equals a product of the second-direction gradient and a predetermined positive number (e.g., represented as W_Edge). In continuation from the above example, the first comparison gradient may be represented as W_Edge*deltaH. For example, the second comparison gradient equals a product of the first-direction gradient and the predetermined positive number, e.g., W_Edge*deltaV.

In step S125, for example, the first estimated pixel value substantially equals a weighted sum of the pixel values of the first plurality of pixels. In step S135, for example, the second estimated pixel value substantially equals a weighted sum of the pixel values of the second plurality of pixels. In continuation from the above example, for the cross-shaped pattern 101, the first estimated pixel value may be represented as a weighted sum of H1 and H2, and the second estimated pixel value may be represented as a weighted sum of V1 and V2. For example, weightings (or weight values) corresponding to the pixel values may be set to ½. For the cross-shaped pattern 102, the first estimated pixel value may be represented as a weighted sum of H1, H2, H3, and H4, and the second estimated pixel value may be represented as a weighted sum of V1, V2, V3, and V4, where the weightings of the pixels may be set to ½.

In alternative embodiments of steps S125 and S135, when calculating the first estimated pixel value (or the second estimated pixel value) according to the above examples, the weightings respectively corresponding to the first plurality of pixels (or the second plurality of pixels) are determined according to respective relative distances of the first plurality of pixels (or the second plurality of pixels) from the target pixel. For example, the corresponding weightings become smaller as the relative distances become larger. Taking the cross-shaped pattern 102 for example, the first estimated pixel value may be represented as w0*H0+w1*H1+w2*H2+w3*H3. The relative distances of the pixel values H1 and H2 from the target pixel PC are smaller than those of the pixel values H0 and H3 from the target pixel, and so weightings w0 and w3 may be respectively be set to be smaller than weightings w1 and w2. In another example satisfying the relative distance relationship of the target pixel, the first estimated pixel value may be set as: (W_P0*(H1+H2)+W_P1*(H0+H3))/(W_P0+W_P1), where W_P0 and W_P1 are real numbers and W_P0 is greater than W_P1. Further, for the calculation of the second estimated pixel value, the weightings for the calculation according to a weighted sum of the second plurality of pixels may also be set following the example for the first estimated pixel value. For example, the second estimated pixel value may be represented as: (W_P0*(V1+V2)+W_P1*(V0+V3))/(W_P0+W_P1).

In the above embodiments of calculating the estimated pixel values with weightings, the calculation process may be regarded as a spatial filter since the weightings are assigned according to relative distances.

In addition, purposes of steps 120 to 125 are to compensate the target pixel, i.e., to obtain the estimate pixel value. More specifically, when a difference between the target pixel and one or more neighboring pixel values along a first direction (e.g., the vertical direction) within the cross-shaped pattern reaches a certain level, it implies that the target pixel may be affected by noise or appear as an unsmooth edge. Therefore, one or more adjacent pixel values along a second direction (e.g., the horizontal direction) having a smaller relative pixel value difference (or having a less effect of noise or a more smooth appearance) is utilized to compensate the target pixel, i.e., to obtain the estimated pixel value. Purposes of steps S130 to S135 are similar to the above, and shall not be described for the sake of brevity. In step S139, since the condition is satisfied and no compensation is required, the pixel value of the target pixel is outputted. Thus, with the additional estimated value obtained by the weighted sum based on the relationship between the weightings and the relative distances as in the above embodiments, an output image rendered by using the edge processing has better image quality with smoother edges therein.

In the above embodiments, the first estimated pixel value and the second estimated pixel value are unrelated to the pixel value of the target pixel. In an alternative embodiment, the target pixel may be included in the calculation for the first estimated pixel value or the second estimated pixel value, with the weighting of the target pixel however preferably being set to be smaller than the weightings of other pixel values for reducing effects of noise.

Figure 2:
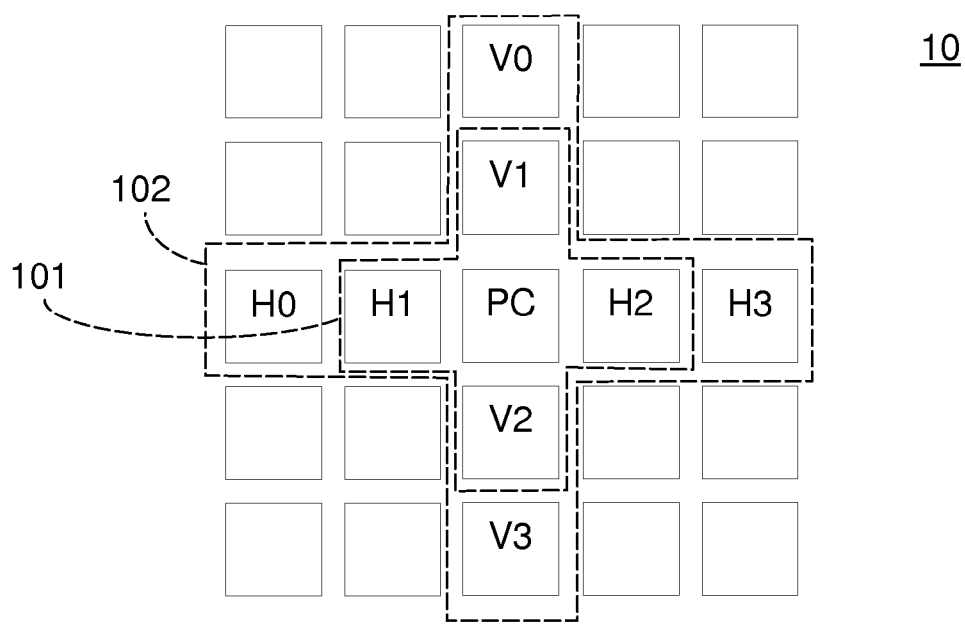
FIG. 2 is a cross-shaped pattern centered at a pixel value in a region of a digital image.
Figure 7:
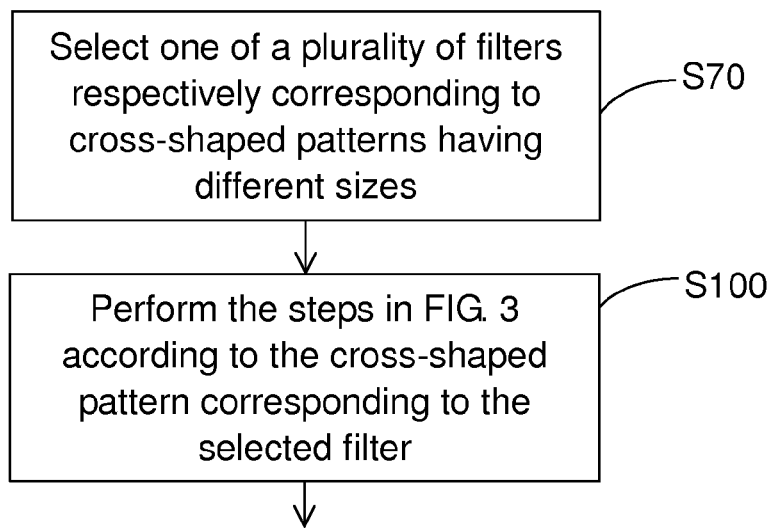
FIG. 7 and FIG. 8 are flowcharts of a method for processing edges in an image according to other embodiments.
Figure 8:
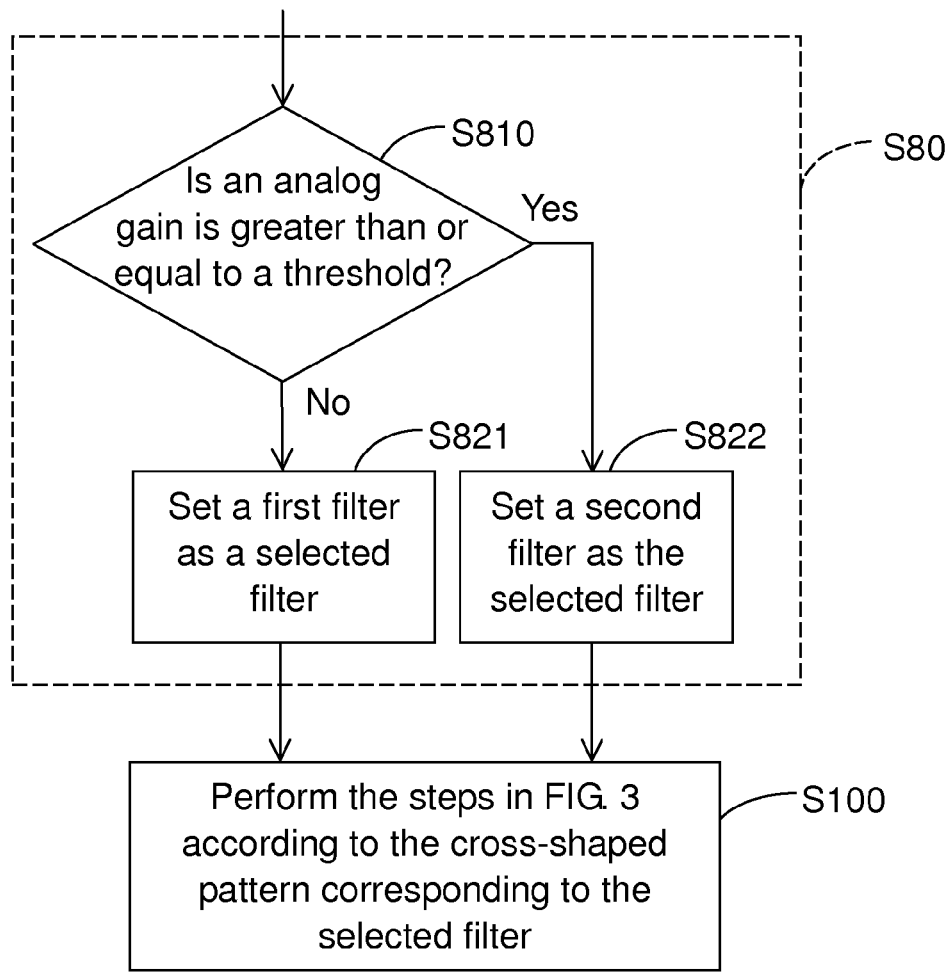

FIGS. 7 and 8 show flowcharts of a method for processing edges in an image according to embodiments. In FIG. 7, as shown in step S70, one of a plurality of filters is selected. The filters respectively correspond to cross-shaped patterns having different sizes. For example, at least two cross-shaped patterns are provided, e.g., the cross-shaped patterns 101 and 102, and one of them is selected. In step S100, according to the cross-shaped pattern corresponding to the selected filter, steps in FIG. 3 are performed. Further, the sequence for performing the steps is not limited and can be in any order, given that the estimated pixel value can be obtained. For example, step S110 may first be performed to calculate the gradients for the filters, followed by performing step S70 and then other steps. In an alternative embodiment, one of the plurality of filters is selected according to an analog gain. For example, in FIG. 8, step S80 represents an embodiment of step S70. In step S810, it is determined whether an analog gain is greater than or equal to a threshold, e.g., 4. When the analog gain is greater than or equal to the threshold, as shown in step S822, a second filter corresponding to a larger cross-shaped pattern as 102 shown in FIG. 2 is set as the selected filter. When the analog gain is not greater than or equal to the threshold, as shown in step S821, a first filter corresponding to a smaller cross-shaped pattern as 101 shown in FIG. 2 is set as the selected filter. Thus, as a greater analog gain indicates that an input image may include amplified noises, a filter corresponding to a larger cross-shaped pattern is selected to obtain smoother effects.

In an alternative embodiment, an input image may be a result of an analog gain process based on an analog gain, or a result of shooting based on a larger ISO value selected (such as 400, 800 or above) or under a circumstance of underexposure. Under any of the above situations, the method in FIG. 3 may be applied to obtain an estimated pixel value by using a filter corresponding to a cross-shaped pattern or by using a filter corresponding to a cross-shaped pattern selected from a number of cross-shaped patterns having different sizes, so as to obtain a processed output image for subsequent image processing (e.g., an edge enhancement process). Further, for example, the cross-shaped pattern, located in a region centered at a target pixel, may be a cross-shaped pattern in a size of 3×3, 5×5 or 7×7 pixels or cross-shaped patterns having other lengths and widths or with lengths different from widths. Therefore, the region 10 in FIG. 1 may also be a region of 3×3, 5×5 or 7×7 pixels or a region having other lengths and widths or with lengths different from widths.

Further, surrounding pixels of an input image, e.g., pixels at the right and upper sides (i.e., first or second columns or rows) of a pixel target PC may also be processed by the method in FIG. 3 or another approach. When a new target pixel is selected from the surrounding pixels, it is possible that a region indicated as the region 10 may not be obtained. In this case, when one of the surrounding pixels serves as a new target pixel, supplementary pixels based on the target pixel may be adopted for the target pixel to obtain a region having the same size as the region 10, and the target pixel can then be processed according to the method in FIG. 3. In an alternative embodiment, when a pixel at a second column or a second row serves as the target pixel, a smaller region (e.g., 3×3 pixels) may be set, and pixels at a first row or a first column may be left unprocessed. Various methods for processing the surrounding pixels are available and are not limited to the above approach.

Figure 4:
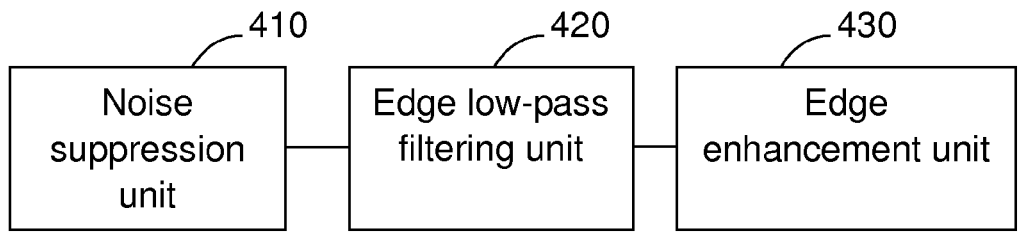
FIG. 4 is a block diagram of an apparatus for processing edges in an image according to an embodiment.
Figure 6:
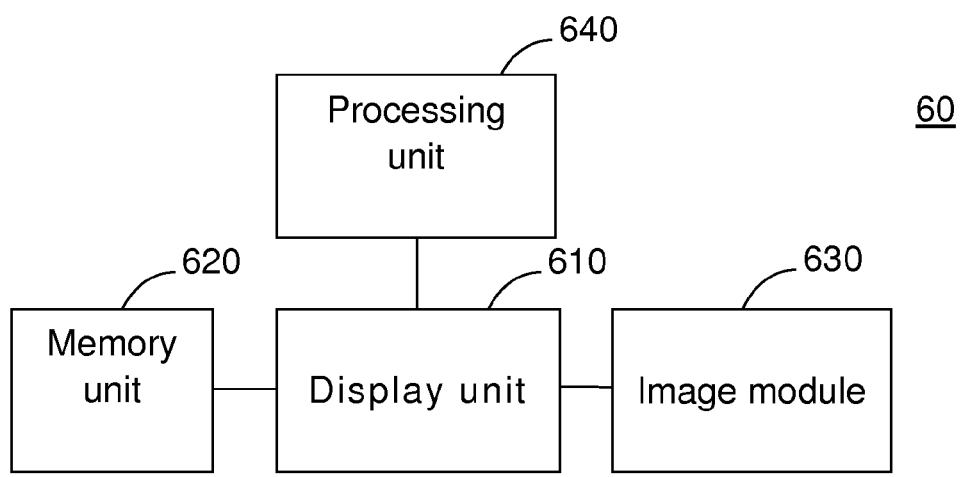
FIG. 6 is a block diagram of an electronic apparatus for implementing the processing edges in an image method in FIG. 3.

Further, the embodiments of the above method may be implemented in various apparatuses supporting image processing, e.g., by an edge low-pass filtering unit 420 of an image processing apparatus 40 (e.g., an image processing chip, an image engine or an image sensor) in FIG. 4, or by an image module or a processing module of an electronic apparatus in FIG. 6.

FIG. 4 shows a block diagram of an image processing apparatus according to an embodiment. The image processing apparatus 40 includes a noise suppression unit 410, an edge low-pass filtering unit 420 and an edge enhancement unit 430. The noise suppression unit 410 includes a low-pass filter, and receives a first image to perform a noise suppression process on the first image to output a second image. The edge low-pass filtering unit 420 receives the second image (i.e., the input image in the method in FIG. 3), and performs an edge low-pass filter process on the second image to smoothen image edges and to output a third image. The edge enhancement unit 430, which may include a high-pass filter, receives the third image to enhance the image edges.

The edge low-pass filtering unit 420 is operative to: calculate a first-direction gradient along a first direction and a second-direction gradient along a second direction with respect to a cross-shaped pattern centered at a target pixel in the second image; and determine whether to compensate the target pixel based on pixel values of a first plurality of pixels along the second direction or pixel values of a second plurality of pixels along the second direction within the cross-shaped pattern, or to output a pixel value of the target pixel. That is to say, hardware circuits of the edge low-pass filtering unit 430 may be implemented according to steps 110 to S139 in FIG. 3. In an embodiment, the edge low-pass filtering unit 420 is coupled between the noise suppression unit 410 and the edge enhancement unit 430, operating by using pipelining.

Figure 5:
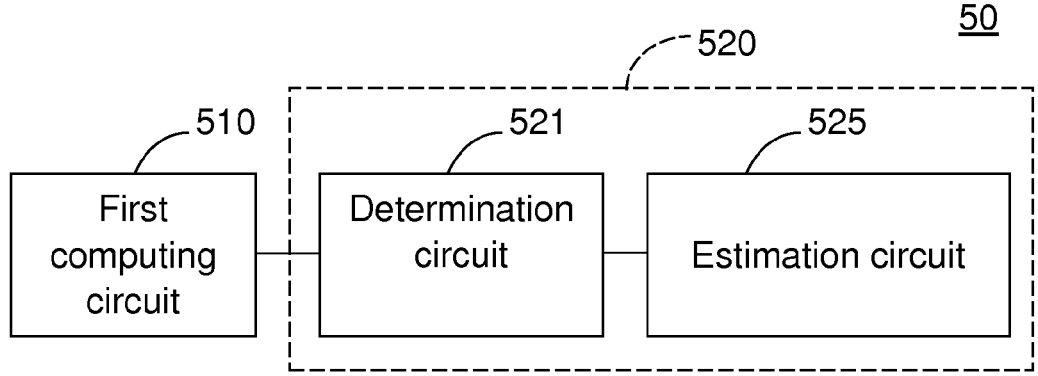
FIG. 5 is a block diagram of an edge low-pass filtering unit in FIG. 4 according to an embodiment.

FIG. 5 shows a block diagram of an edge low-pass filtering unit in FIG. 4 according to an embodiment. An edge low-pass filtering unit 50 includes a first computing circuit 510 and a second computing circuit 520. The first computing circuit 510 includes circuits for implementing step S110. The second computing circuit 520 includes circuits for implementing steps S120 to S139. More specifically, the second computing circuit 520 includes a determination circuit 521 for implementing steps S120 and 130, and an estimation circuit 525 for implementing steps S125, S135 and S139.

FIG. 6 shows a block diagram of an electronic apparatus for implementing the processing edges in an image method in FIG. 3 according to an embodiment. For example, an electronic apparatus 60 is an apparatus capable of performing image processing, e.g., a digital camera, a smart phone, a tablet computer, a multimedia device, a television, or a computer. The electronic apparatus 60 includes a processing unit 610, a memory unit 620, an image module 630, and a display unit 640. In an example, the processing unit 610 accesses program instructions from the memory unit 620 to implement the embodiments of the method in FIG. 3.

As illustrated with descriptions associated with FIGS. 4 to 6, the method for processing edges in an image according to different embodiments may be implemented by an integrated circuit such as a microcontroller, a microprocessor, a digital signal processor, an application specific integrated circuit (ASIC) or a field programmable gate array (FPGA), or a logic circuit.

In the above embodiments, each of the pixels may indicate an R/G/B value or a Y (luma) value or other converted values of different color coordinates. Further, each of the pixel targets of an input image may respectively correspond to values of different components or sub-pixels of the target pixels, e.g., Y or R, and the estimated pixel value corresponding to the target pixel can be obtained by an embodiment of the method in FIG. 3.

Method and apparatus for processing edges in an image are described in the above embodiments. In some embodiments, a resolution of an input image can be maintained since gradient determinations are utilized. Further, smoothing process is performed on vertical or horizontal edges in an image to allow edges to appear smoother, so as to reduce noises and artifacts and to render a clearer image. In addition, some embodiments adopt certain coefficients (e.g., the predetermined positive numbers in step S120 or S130) for controlling the edge processing to further determine whether computations for an estimated pixel value need to be performed, thereby effectively reducing the required memory capacity. Further, in some embodiments, different levels of processing may be performed according to different filters to offer the method with greater flexibilities. The method for processing edges in an image involve calculations with reduced complexity and can thus be easily integrated into various image processing apparatuses, platforms, and software. Moreover, effects of the method may also be experimentally verified through quantization.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for processing edges in an image, comprising:
    a) calculating, by an electronic apparatus, a first-direction gradient along a first direction and a second-direction gradient along a second direction with respect to a cross-shaped pattern centered at a target pixel within a region of an input image;
    b) determining whether the first-direction gradient is greater than a first comparison gradient by the electronic apparatus, wherein the first comparison gradient is determined according to the second-direction gradient;
    c) obtaining, by the electronic apparatus, a first estimated pixel value based on pixel values of a first plurality of pixels along the second direction within the cross-shaped pattern as an estimated pixel value of the target pixel when a determination result of step (b) is affirmative;
    d) determining, by the electronic apparatus, whether the second-direction gradient is greater than a second comparison gradient when the determination result of step (b) is negative, wherein the second comparison gradient is determined according to the first-direction gradient;
    e) obtaining, by the electronic apparatus, a second estimated pixel value based on pixel values of a second plurality of pixels along the first direction within the cross-shaped pattern as the estimated pixel value of the target pixel when a determination result of step (d) is affirmative; and
    f) outputting, by the electronic apparatus, a pixel value of the target pixel when the determination result of step (d) is negative.

2. The method according to claim 1, further comprising:
    calculating, by the electronic apparatus, one or more first-direction unit gradients for pixels located at different distances from the target pixel along the first direction within the cross-shaped pattern; and
    calculating, by the electronic apparatus, one or more second-direction unit gradients for pixels located at different distances from the target pixel along the second direction within the cross-shaped pattern;
    wherein, in step (a), the first-direction gradient is a sum of the one or more first-direction unit gradients, and the second-direction gradient is a sum of the one or more second-direction unit gradients.

3. The method according to claim 2, wherein each of the one or more first-direction unit gradients is a sum of absolute differences of two sets of two adjacent pixels at two opposite sides of the target pixel along the first direction within the cross-shaped pattern, and each of the one or more second-direction unit gradients is a sum of absolute differences of two sets of two adjacent pixels at two opposite sides of the target pixel along the second direction within the cross-shaped pattern.

4. The method according to claim 1, wherein the first comparison gradient substantially equals a product of the second-direction gradient and a predetermined positive number, and the second comparison gradient substantially equals a product of the first-direction gradient and the predetermined positive number.

5. The method according to claim 1, wherein the first estimated pixel value substantially equals a weighted sum of the pixel values of the first plurality of pixels, and the second estimated pixel value substantially equals a weighted sum of the pixel values of the second plurality of pixels.

6. The method according to claim 5, wherein weightings corresponding to the respective first plurality of pixels and the respective second plurality of pixels are determined according to respective relative distances of the first plurality of pixels and the second plurality of pixels from the target pixel.

7. The method according to claim 6, wherein the weightings become smaller as the corresponding relative distances become larger.

8. The method according to claim 3, further comprising:
    selecting one of a plurality of filters corresponding to respective cross-shaped patterns having different sizes;
    wherein steps (a) to (f) are performed according to the cross-shaped pattern corresponding to the selected filter.

9. The method according to claim 8, wherein the step of selecting one of the plurality of filters is determined according to an analog gain.

10. The method according to claim 1, wherein the first estimated pixel value and the second estimated pixel value are unrelated to the pixel value of the target pixel.

11. An apparatus for edge image processing, comprising:
    a noise suppression unit, including a low-pass filter, for receiving a first image and performing noise suppression on the first image to output a second image;
    an edge low-pass filtering unit, for receiving the second image and performing edge low-pass filtering on the second image to smooth edges in the second image to output a third image; and an edge enhancement unit, comprising a high-pass filter, for receiving the third image and enhancing edges in the third image;

wherein the edge low-pass filtering unit is operative to:

calculate a first-direction gradient along a first direction and a second-direction gradient along a second direction with respect to a cross-shaped pattern centered at a target pixel in the second image; and determine whether to compensate the target pixel based on pixel values of a first plurality of pixels along the second direction or pixel values of a second plurality of pixels along the first direction within the cross-shaped pattern, or to output a pixel value of the target pixel.

12. The apparatus according to claim 11, wherein the edge low-pass filter is operative to:

determine whether the first-direction gradient is greater than a first comparison gradient, wherein the first comparison gradient is determined according to the second-direction gradient; and obtain a first estimated pixel value as an estimated pixel value of the target pixel based on the pixel values of the first plurality of pixels when it is determined that the first-direction gradient is greater than the first comparison gradient.

13. The apparatus according to claim 12, wherein when it is determined that the first-direction gradient is not greater than the first comparison gradient, the edge low-pass filtering unit further is operative to:

determine whether the second-direction gradient is greater than a second comparison gradient, wherein the second comparison gradient is determined according to the first-direction gradient; and obtain a second estimated pixel value as the estimated pixel value of the target pixel based on the pixel values of the second plurality of pixels when it is determined that the second-direction gradient is greater than the second comparison gradient.

14. The apparatus according to claim 13, wherein the edge low-pass filtering unit outputs a pixel value of the target pixel when it is determined that the second-direction gradient is not greater than the second comparison gradient.

15. The apparatus according to claim 12, wherein the first comparison gradient substantially equals a product of the second-direction gradient and a first predetermined positive number.

16. The apparatus according to claim 13, wherein the second comparison gradient substantially equals a product of the first-direction gradient and a second predetermined positive number.

17. The apparatus according to claim 12, wherein the first estimated pixel value substantially equals a weighted sum of the pixel values of the first plurality of pixels.

18. The apparatus according to claim 13, wherein the second estimated pixel value substantially equals a weighted sum of the pixel values of the second plurality of pixels.

19. The apparatus according to claim 11, wherein the edge low-pass filtering unit comprises:

a first computing circuit, for calculating the first-direction gradient along the first direction and the second-direction gradient along the second direction with respect to the cross-shaped pattern centered at the target pixel in the second image; and a second computing circuit, for determining, according to the first-direction gradient and the second-direction gradient, whether to compensate the target pixel based on pixel values of the first plurality of pixels along the second direction or pixel values of the second plurality of pixels along the first direction within the cross-shaped pattern, or to output the pixel value of the target pixel.

20. The apparatus according to claim 19, wherein the second computing circuit is operative to determine whether the first-direction gradient is greater than a first comparison gradient, wherein the first comparison gradient is determined according to the second-direction gradient, and to output a first estimated pixel value based on the pixel values of the first plurality of pixels as an estimated pixel value of the target pixel when it is determined that the first-direction gradient is greater than a first comparison gradient.

21. The apparatus according to claim 20, wherein when it is determined that the first-direction gradient is not greater than the first comparison gradient, the second computing circuit further determines whether the second-direction gradient is greater than a second comparison gradient, wherein the second comparison gradient is determined according to the first-direction gradient, and outputs a second estimated pixel value based on the pixel values of the second plurality of pixels as an estimated pixel value of the target pixel when it is determined that the second-direction gradient is greater than the second comparison gradient.

22. The apparatus according to claim 21, wherein the second computing circuit outputs the pixel value of the target pixel when it is determined that the second-direction gradient is not greater than the second comparison gradient.

* * * * *